United States Patent
Uhrich et al.

(10) Patent No.: US 8,707,683 B2
(45) Date of Patent: *Apr. 29, 2014

(54) HYDROCARBON RETAINING AND PURGING SYSTEM

(75) Inventors: Michael James Uhrich, West Bloomfield, MI (US); Stephen B. Smith, Livonia, MI (US); James Michael Kerns, Trenton, MI (US); Shane Elwart, Ypsilanti, MI (US); Jason Aaron Lupescu, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 183 days.

This patent is subject to a terminal disclaimer.

(21) Appl. No.: 13/454,450

(22) Filed: Apr. 24, 2012

(65) Prior Publication Data

US 2012/0204544 A1    Aug. 16, 2012

Related U.S. Application Data

(63) Continuation of application No. 12/396,782, filed on Mar. 3, 2009, now Pat. No. 8,161,733.

(51) Int. Cl.
*F01N 3/00* (2006.01)
*F01N 5/00* (2006.01)

(52) U.S. Cl.
USPC .................. 60/287; 60/281; 60/284

(58) Field of Classification Search
USPC ........... 60/273, 274, 282, 284, 287, 288, 291, 60/296, 297, 299, 309, 317, 319
See application file for complete search history.

(56) References Cited

U.S. PATENT DOCUMENTS

| | | | |
|---|---|---|---|
| 3,961,477 A * | 6/1976 | Grieshaber et al. | 60/274 |
| 5,277,026 A * | 1/1994 | Boll et al. | 60/288 |
| 5,398,503 A | 3/1995 | Danno et al. | |
| 5,410,875 A | 5/1995 | Tanaka et al. | |
| 5,467,594 A | 11/1995 | Aoki et al. | |
| 6,178,743 B1 * | 1/2001 | Hirota et al. | 60/277 |
| 6,378,298 B2 | 4/2002 | Harima et al. | |
| 2003/0140621 A1 * | 7/2003 | Khair et al. | 60/286 |
| 2005/0120731 A1 | 6/2005 | Lamont et al. | |

* cited by examiner

*Primary Examiner* — Thomas Denion
*Assistant Examiner* — Mickey France
(74) *Attorney, Agent, or Firm* — Julia Voutyras; Alleman Hall McCoy Russell & Tuttle LLP

(57) ABSTRACT

Methods and systems are provided for operating an engine having a hydrocarbon retaining system and an emission control device coupled to an engine exhaust, the engine exhaust comprising a venturi. One example method comprises, during a storing condition, routing exhaust gas through the venturi without generating a venturi action, and then to the hydrocarbon retaining system, while bypassing the emission control device, to store hydrocarbons in the hydrocarbon retaining system, and during a purging condition, routing exhaust gas through the venturi while generating venturi action, then to the emission control device, and then to the hydrocarbon retaining system, to purge stored hydrocarbons, wherein a flow of purged hydrocarbons is drawn back to the venturi via venturi action.

15 Claims, 8 Drawing Sheets

HYDROCARBON RETAINING AND PURGING SYSTEM

CROSS REFERENCE TO RELATED APPLICATIONS

The present application is a continuation of U.S. patent application Ser. No. 12/396,782 filed Mar. 3, 2009, the entire contents of which are incorporated herein by reference for all purposes.

FIELD

The present description relates generally to an exhaust treatment system for a combustion engine.

BACKGROUND/SUMMARY

Engine out cold-start hydrocarbon emissions generated before light-off of an exhaust system catalytic converter may contribute a large percentage of the total exhaust hydrocarbon (HC) emissions. Accordingly, engine exhaust systems may utilize hydrocarbon retaining devices, such as hydrocarbon traps, to retain cold start emissions for later reaction (HC storing), or for recirculation through the engine (HC purging).

One example system for storing and purging hydrocarbon emissions is shown by Tanaka et al. in U.S. Pat. No. 5,410,875. Herein, a HC trap is positioned in a first exhaust bypass passage for storing HC emissions during engine cold start. When exhaust temperatures reaches a desired threshold, the stored HCs are purged into an exhaust main passage via a second bypass passage.

However, the inventors have recognized several potential issues with such a system. As one example, when returning exhaust gas to a location upstream of a catalyst in the main passage, the system flows gases against exhaust pressure. As such, this may reduce the efficiency with which the gases are purged into the main exhaust passage. As another example, a large number of valves and passages are used to ensure the correct flow of purged HCs against the exhaust pressure. These include multiple valves and passages required to direct exhaust flow from the exhaust bypass passage to the exhaust main passage, as well as valves and passages required to ensure manifold vacuum and pull ambient air for trap purging. As such, the need for additional hardware adds cost and complexity to the system Thus, in one example, some of the above issues may be addressed by a method of operating an engine having a hydrocarbon retaining system and an emission control device coupled to an engine exhaust, the engine exhaust comprising a venture. The method may comprise, during a storing condition, routing exhaust gas through the venturi without generating a venturi action, and then to the hydrocarbon retaining system, while bypassing the emission control device, to store hydrocarbons in the hydrocarbon retaining system. The method may further comprise, during a purging condition, routing exhaust gas through the venturi while generating venturi action, then to the emission control device, and then to the hydrocarbon retaining system, to purge stored hydrocarbons, wherein a flow of purged hydrocarbons is drawn back to the venturi via venturi action.

In one example, a venturi with at least three openings may be located in an engine exhaust conduit. Specifically, the venturi may be located at a junction between a bypass conduit wherein a HC trap may be positioned and a main exhaust conduit. At least one of the openings may be located in the narrow region of the venturi and may provide a passage into the bypass conduit. Similarly, at least one of the openings may be located in a broad region of the venturi and may provide a passage into the main exhaust conduit, towards an emission control device and/or the atmosphere. During a storing operation, flow through the venturi may be adjusted to disable a venturi action, for example by restricting flow through an opening in the broad region of the venturi. Consequently, exhaust gas may enter the bypass conduit, through the opening in the narrow region of the venturi, and exhaust HCs may be trapped. In contrast, during a purging operation, flow through the venturi may be adjusted to enable a venturi action, for example by enabling flow through the previously restricted opening in the broad region of the venturi. The resulting low pressure region created in the venturi (that is, the venturi action generated) may enable exhaust to be drawn in from the bypass conduit and HC trap towards the venturi. Specifically, the exhaust may be drawn in through the opening in the narrow (e.g., lower pressure) region of the venturi. The exhaust may then flow through an opening in the broad region of the venturi into the main exhaust conduit and a downstream emission control device before being vented to the atmosphere.

In this way, the direction of flow through a venturi may be alternated by selectively (e.g., sequentially in one example) restricting and un-restricting flow to/from at least one opening of the venturi. By regulating flow through the venturi opening, a venturi action may be sequentially increased and decreased (e.g., enabled and disabled), thereby selectively varying the direction of an exhaust flow. By enabling a venturi action, purged HCs may be drawn into a main exhaust conduit without flowing against exhaust pressure. That is, HC purging may be enabled with a reduced amount of additional hardware (such as valves and passages) to provide proper flow (although additional valves may be used, if desired). In this way, the use of a venturi may be extended to engine exhaust after-treatment even when the venturi action is disabled.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
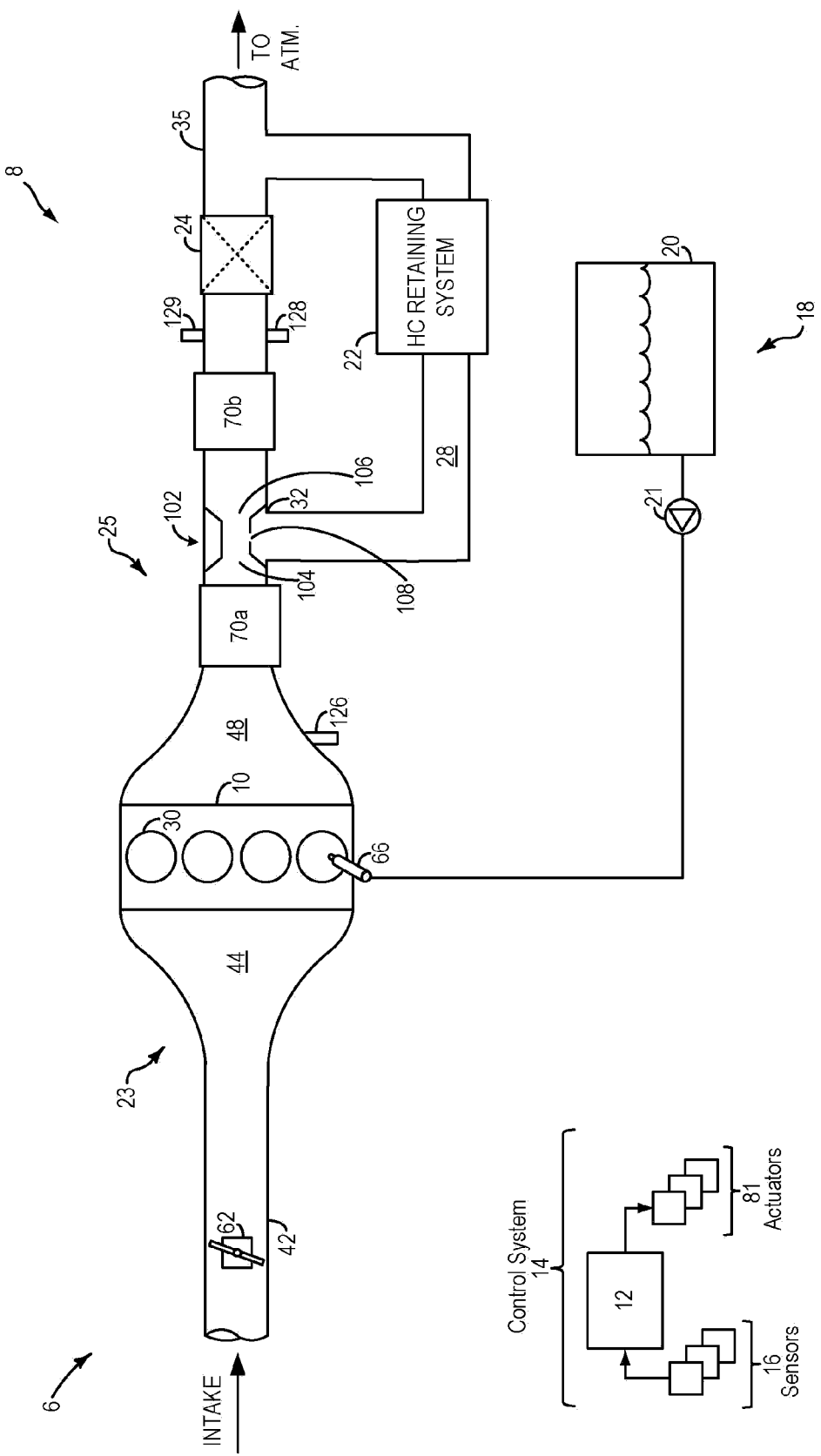
FIG. 1 shows a schematic depiction of an engine and an associated hydrocarbon retaining system.

The following description relates to systems and methods for operating a HC retaining system coupled to an engine exhaust including a venturi, with at least three openings, as shown in FIG. 1. As illustrated with reference to FIGS. 2A-B and FIGS. 3A-B, by selectively restricting and un-restricting flow through at least one opening of the venturi, to thereby alternately increase/decrease (e.g., disable/enable) a related venturi action, a venturi positioned in the exhaust conduit may be advantageously used to substantially improve flow of exhaust through the HC retaining system. A controller may be configured to adjust a rate and direction of exhaust flow through the venturi using routines such as those illustrated with reference to FIGS. 4-5. As illustrated with reference to FIG. 6, the controller may be further configured to adjust an engine air-fuel ratio responsive to the operating conditions of the HC retaining system to thereby enable a final air-fuel ratio that is substantially at stoichiometry. In this way, use of the venturi in exhaust after-treatment may be extended to conditions when substantially no venturi action is enabled. By appropriate positioning of the venturi in the engine exhaust including a hydrocarbon trap, it is possible to achieve multiple flow configurations that provide for both storing and purging operation of the hydrocarbon trap. Further, by enabling exhaust treatment without necessitating additional valves, passages and related hardware, the cost and complexity of a HC retaining system may be reduced while improving its performance.

Figure 2A:
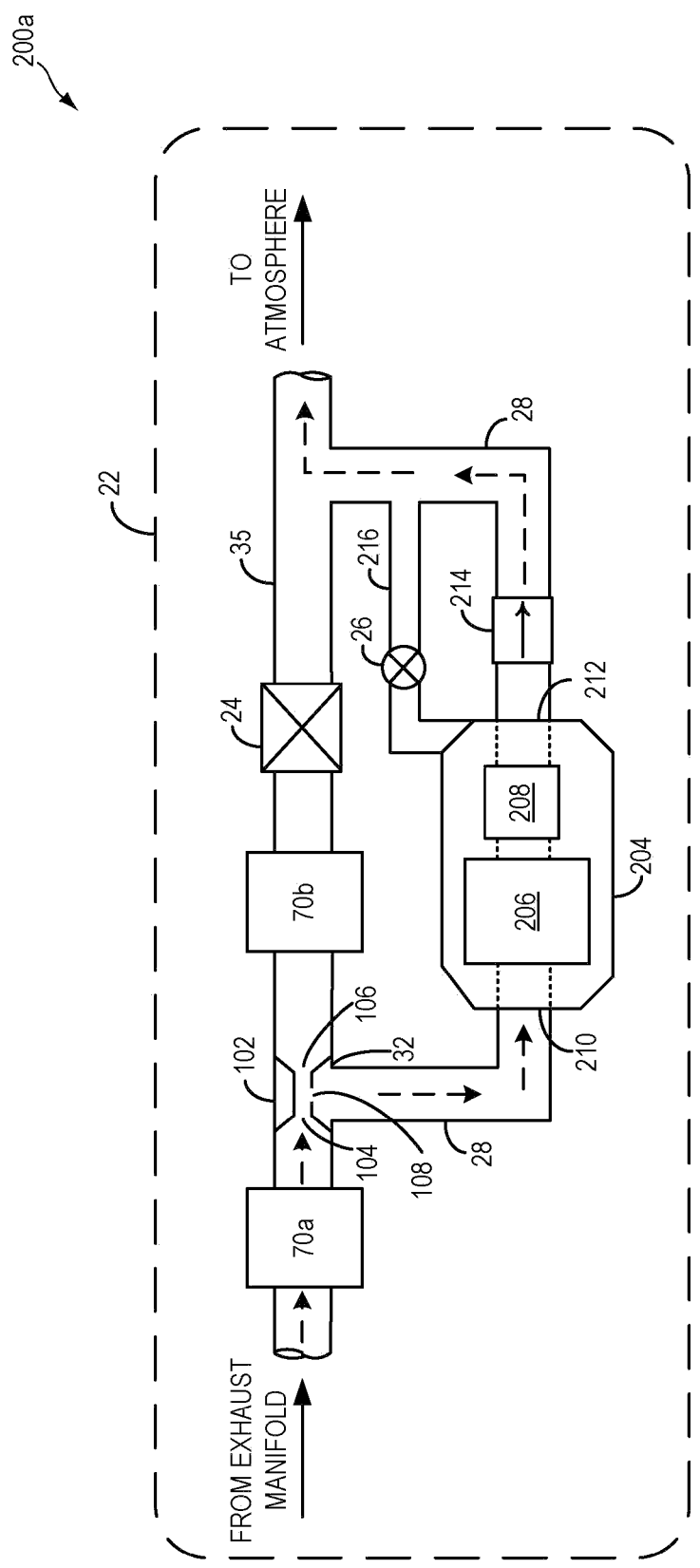
FIGS. 2A-B show a first embodiment of the hydrocarbon retaining system of FIG. 1 during a HC storing operation (FIG. 2A) and a HC purging operation (FIG. 2B).
Figure 2B:
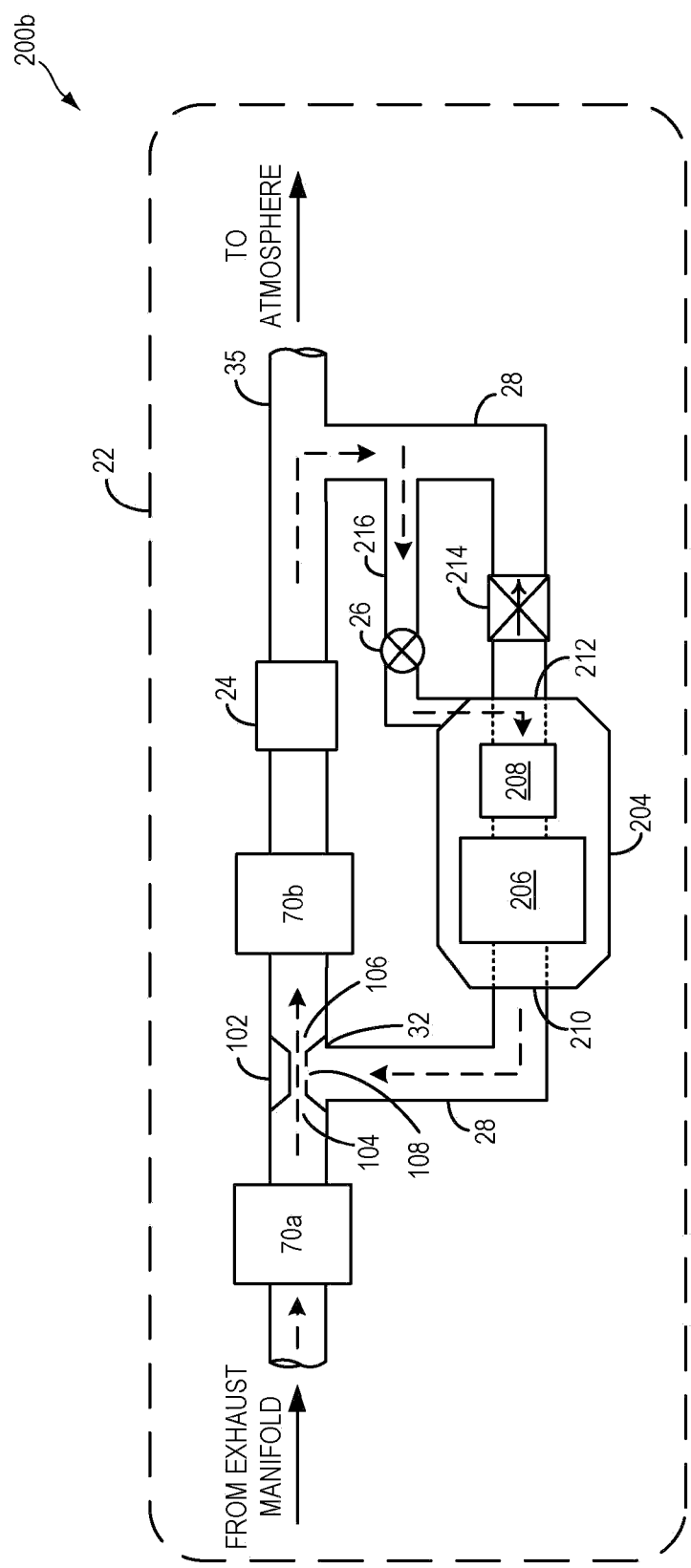
Figure 3A:
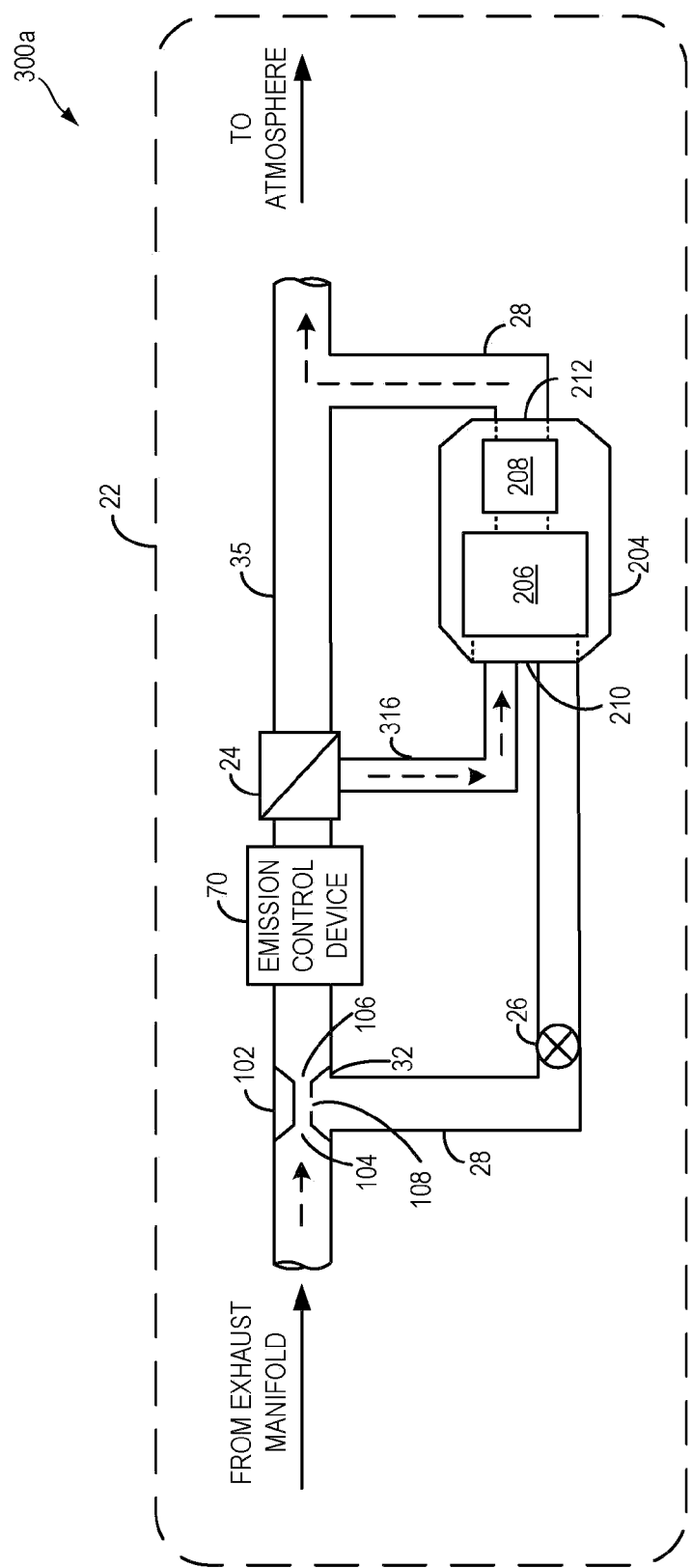
FIGS. 3A-B show a second embodiment of the hydrocarbon retaining system of FIG. 1 during a HC purging operation (FIG. 3A) and a HC purging operation (FIG. 3B).
Figure 3B:
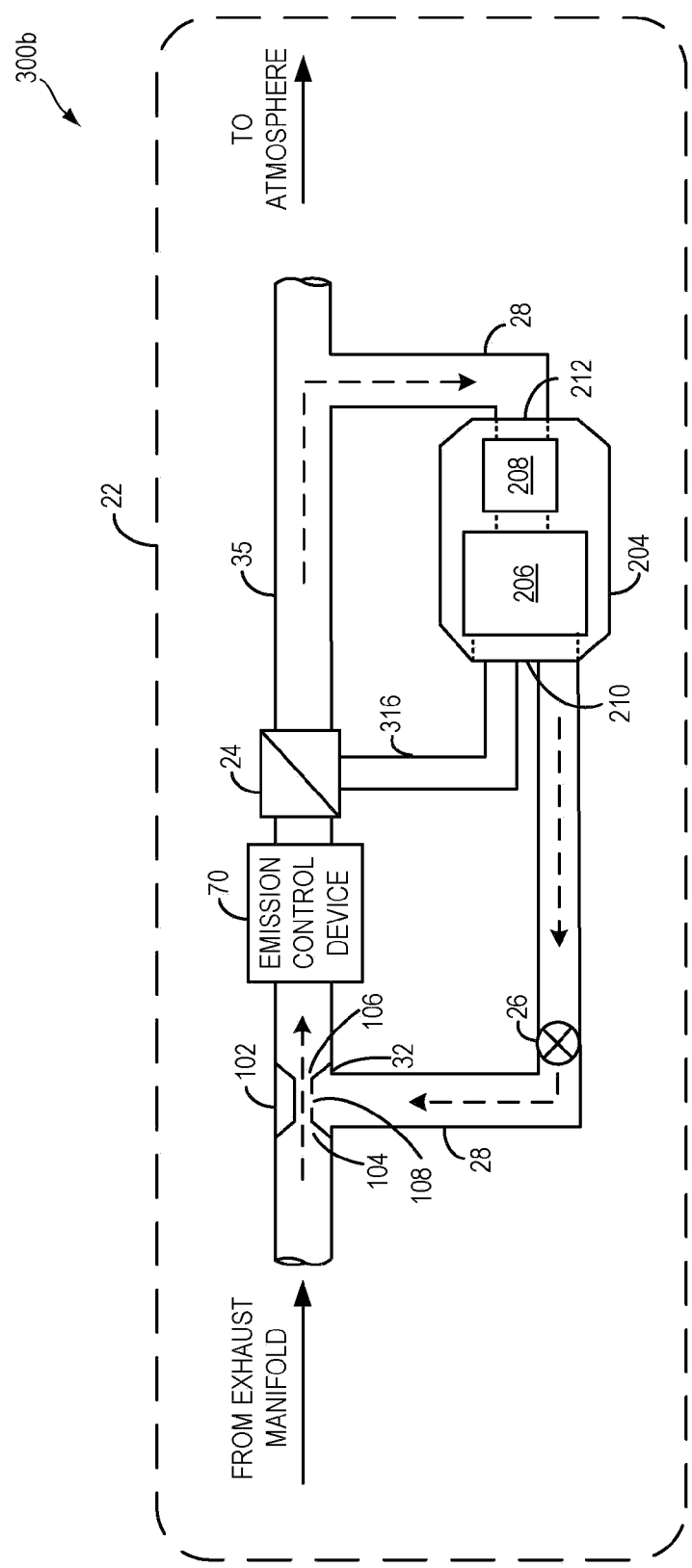

FIG. 1 shows a schematic depiction of a vehicle system 6. The vehicle system 6 includes an engine system 8 coupled to a hydrocarbon (HC) retaining system 22 and a fuel system 18. The engine system 8 may include an engine 10 having a plurality of cylinders 30. The engine 10 includes an engine intake 23 and an engine exhaust 25. The engine intake 23 includes a throttle 62 fluidly coupled to the engine intake manifold 44 via an intake passage 42. The engine exhaust 25 includes an exhaust manifold 48 leading to a main exhaust conduit 35 that routes exhaust gas to the atmosphere. The engine exhaust 25 may include one or more emission control devices, such as a first emission control device 70a and a second emission control device 70b, which may be mounted in a close-coupled position in the exhaust. While FIGS. 1 and 2A-B illustrate embodiments where the engine exhaust includes two emission control devices, FIGS. 3A-B illustrate an alternate embodiment where the engine exhaust includes a single emission control device. The one or more emission control devices may include a three-way catalyst, lean NOx trap, diesel particulate filter, oxidation catalyst, etc. It will be appreciated that other components may be included in the engine such as a variety of valves and sensors, as further elaborated in the example embodiments of FIGS. 2(A-B) and 3(A-B).

The engine exhaust 25 may also be operatively coupled to HC retaining system 22 via exhaust bypass conduit 28 and exhaust shut-off valve 24. In one example, as illustrated in FIG. 3, exhaust shut-off valve 24 may be a diverter valve configured to direct a flow of air in a specified direction (for example, along a particular exhaust conduit) while disabling a flow of air in another direction (for example, along an alternate exhaust conduit). HC retaining system 22 may include one or more HC retaining devices, such as a HC trap or a HC trap assembly configured to temporarily trap HCs from entering gases. A venturi 102 may be located at the junction 32 of exhaust conduit 35 and bypass conduit 28. In one embodiment, as illustrated in FIGS. 1 and 2A-B, venturi 102 may be positioned between the first and second emission control devices 70a and 70b. In another embodiment, as illustrated in FIGS. 3A-B, venturi 102 may be positioned upstream of emission control device 70. In either embodiment, by adjusting a configuration of the exhaust shut-off valve, a rate and direction of exhaust flow through the venturi may be adjusted.

In one example, during engine cold start operation, exhaust gases may be routed to the hydrocarbon retaining system 22 by closing exhaust shut-off valve 24. Then, once the emission control device 70 has reached its operating temperature, the shut-off valve may be opened, and the HCs retained in system 22 may be purged into the engine exhaust conduit 35. As further elaborated below and with reference to FIGS. 2(A-B) and 3(A-B), a rate and direction of flow through the venturi 102 may be adjusted to thereby adjust a lower pressure region (hereafter also referred to as a "venturi action" or "venturi effect") in the venturi 102 and junction 32.

Venturi 102 may be configured with a plurality of openings including at least a first opening 104, a second opening 106, and a third opening 108. Specifically, first opening 104 may be located in a broad inlet region of the venturi, second opening 106 may be located in a broad outlet region of the venturi, while third opening 108 may be located in a narrow region of the venturi. In one example, by restricting (e.g., blocking) flow through second opening 106, a venturi action may be disabled. Consequently, an exhaust flow entering the venturi at first opening 104 may be routed through third opening 108 into bypass conduit 28. In another example, by un-restricting flow through second opening 106, that is, by enabling flow from the first opening to the second opening 106, a venturi action may be enabled. Consequently, an exhaust flow entering the venturi at first opening 104 may be routed through second opening 106, thereby generating a low pressure region near opening 108, which then draws in flow to venturi 102 through third opening 108 from branched conduit 28. In this way, by selectively restricting/un-restricting flow through an opening of the venturi, a lower pressure region in the venturi may be adjusted to thereby adjust a rate and direction of exhaust flow.

Fuel system 18 may include a fuel tank 20 coupled to a fuel pump system 21. The fuel pump system 21 may include one or more pumps for pressurizing fuel delivered to the injectors of engine 10, such as the example injector 66 shown. While only a single injector 66 is shown, additional injectors are provided for each cylinder. It can be appreciated that fuel system 18 may be a return-less fuel system, a return fuel system, or various other types of fuel systems. The fuel tank 20 may hold a plurality of fuel blends, including fuel with a range of alcohol concentrations, such as various gasoline-ethanol blends, including E10, E85, gasoline, etc., and combinations thereof.

The vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, temperature sensor 128, and pressure sensor 129. Other sensors such as pressure, temperature, air/fuel ratio, and composition sensors may be coupled to various locations in the vehicle system 6. As another example, the actuators may include fuel injector 66, valve 24, and throttle 62. The control system 14 may include a controller 12. The controller may receive input data from the various sensors, process the input data, and trigger the actuators in response to the processed input data based on instruction or code programmed therein corresponding to one or more routines. Example control routines are described herein with regard to FIGS. 4-5.

HC retaining system 22 can operate to store HCs from the engine exhaust 25. Under some operating conditions, such as during engine cold starts, when the emission control device has not yet reached its light-off temperature (e.g., a temperature at which the device reaches a selected, sufficiently high, conversion efficiency for a particular exhaust constituent), flow through a venturi in the HC retaining system may be adjusted so that exhaust gas may be routed from the engine exhaust 25 to the HC retaining system 22 (in bypass conduit 28), and then to the atmosphere through exhaust conduit 35. In this way, an increased amount of cold start HC emissions may be stored in HC retaining system 22 while the exhaust gases heat emission control device 70. Then, once device 70 reaches sufficient operating temperature, flow through the venturi may be re-adjusted so that exhaust gases may be routed through bypass conduit 28 and HC retaining system 22 in a reverse direction, as a consequence of being drawn into venturi 102 through venturi action. In this way, an increased amount of stored HCs may be purged from HC retaining system 22, for example using heated exhaust gas, and treated in emission control device 70 before being released into the atmosphere. It will be appreciated that other components may be included in the HC retaining system, such as a variety of valves and sensors, as further elaborated in the example embodiments of FIGS. 2(A-B) and 3(A-B).

FIG. 2A shows a first embodiment 200a of hydrocarbon retaining system 22 including hydrocarbon retaining devices, such as HC traps and trap assemblies, arranged in parallel with exhaust conduit 35, downstream of the two emission control devices. Specifically, the hydrocarbon retaining system is shown during a HC storing operation while FIG. 2B shows an embodiment 200b of the hydrocarbon retaining system of FIG. 2A during a HC purging operation. FIG. 3A shows an alternate embodiment 300a of hydrocarbon retaining system 22 including hydrocarbon retaining devices, such as HC traps and trap assemblies, arranged in parallel with exhaust conduit 35, downstream of a single emission control device. Specifically, the hydrocarbon retaining system is shown during a HC storing operation while FIG. 3B shows an embodiment 300b of the hydrocarbon retaining system of FIG. 3A during a HC purging operation. It will be appreciated that like numbered components introduced in FIGS. 2A-B may be referenced similarly in FIGS. 3A-B.

In FIG. 2A, HC retaining system 22 includes a HC trap 204. The HC trap may be in the form of a brick comprising a base substrate layered with one or more appropriate HC adsorbents. As depicted, HC trap 204 may include a first HC adsorbent 206 and a second HC adsorbent 208.

The first HC adsorbent 206 may be positioned between an inlet port 210 of the HC trap and the second HC adsorbent 208, while second HC adsorbent 208 may be positioned between the first HC adsorbent 206 and an outlet port 212 of the HC trap. The adsorbents may include micropore (0-2 nm pore size range) or mesopore (2-50 nm pore size range) activated carbon and/or zeolites. Furthermore, the different adsorbents may have differing affinity to selected hydrocarbon chains. In one example, first HC adsorbent 206 may include mesopore activated carbon or zeolite for efficiently adsorbing and trapping larger HCs while second HC adsorbent 208 may include micropore activated carbon or zeolite for efficiently adsorbing and trapping smaller HCs. As such, larger HCs, as adsorbed by first adsorbent 206, may be desorbed more effectively during a purging operation. Thus, in one example, as depicted herein, first HC adsorbent 206 may have a larger bed volume than second adsorbent 208, to better enable a larger fraction of cold-start HC emissions to be adsorbed during the storing operation HC trap 204 may be further coupled to one-way check valve 214 positioned downstream of the trap along bypass conduit 28. Specifically, one-way check valve 214 may be configured to allow flow of air in a single direction, that is, from HC trap outlet port 212 towards exhaust conduit 35. In one example, check valve 214 may be a pressure regulated valve configured to open when a predetermined pressure threshold is applied at the inlet port 210 of the HC trap.

HC trap 204 may also be operatively coupled to a vapor management valve (VMV) 26. VMV 26 may be positioned in branched conduit 216. During a purging operation, as further elaborated herein with reference to FIG. 2B, heated exhaust may be routed from exhaust conduit 35, through branched conduit 216, into HC trap 204 via VMV 26. In this way, VMV 26 may enable a metered flow of exhaust gas to be routed through the trap in the reverse direction (that is, from trap outlet port 212 towards trap inlet port 210).

When HC storing conditions are met, for example during engine cold start, a controller may close shut-off valve 24 and VMV 26. Further, the controller may open one-way check valve 214. Alternatively, check valve 214 may open in response to a flow of exhaust through the HC trap 204 in a forward direction. As a result of shut-off valve 24 closure, flow of exhaust through the second opening 106 of venturi 102 may be restricted, resulting in a venturi action being disabled, or reduced. Consequently, exhaust that has flown through emission control device 70a and that is entering the venturi at first opening 104 may be routed through third opening 108 into bypass conduit 28. Exhaust may then pass through HC trap 204, specifically through first adsorbent 206 followed by second adsorbent 208, wherein sequentially larger and smaller HCs, respectively, may be adsorbed. The cleaned exhaust may then pass through check valve 214, which opens due to the pressure applied by the exhaust flow at the HC trap inlet port 210. Exhaust may further travel along bypass conduit 28 to reach exhaust conduit 35 wherefrom it may be vented to the atmosphere. It will be appreciated herein that the exhaust may not flow through emission control device 70b. In this way, a venturi may be used, even when there is substantially no venturi action, to provide flow of exhaust through a HC retaining system during a HC storing operation.

If HC trap 204 reaches its full loading capacity during the storing operation, but before emission control device 70a (and 70b) has reached its light-off temperature, then the controller may adjust a configuration of the valves in HC retaining system 22 to thereby enable an exhaust venting operation. Herein, in one example, exhaust shut-off valve 24 may be opened and VMV 26 may be closed. Additionally one-way check valve 214 may be closed. Alternatively, check valve 214 may remain closed due to an insufficient pressure difference across the HC trap. Consequently, flow of exhaust through the second opening 106 of venturi 102 may be unrestricted, while flow of exhaust through the third opening 108 of venturi 102 may be restricted. As a result, venturi action may remain disabled, or reduced. Therefore, exhaust entering the venturi at first opening 104 may be routed through second opening 106 into main exhaust conduit 35, and vented into the atmosphere. In this way, a venturi may be used, even when there is substantially no venturi action, to provide flow of exhaust through a HC retaining system during an exhaust venting operation following a HC storing operation. In doing so, exhaust may not be routed through the HC trap of bypass conduit 28, thereby disabling further HC storage when the HC trap is already full. Furthermore, a HC purging operation may be delayed until an emission control device of the HC retaining system has reached the desired temperature.

FIG. 2B depicts an embodiment 200b of hydrocarbon retaining system 22 during a HC purging operation. When purging conditions are met, for example when emission control device light off temperature is attained, a controller may open shut-off valve 24 and close one-way check valve 214. Alternatively, check valve 214 may remain closed in response to substantially no flow of exhaust through HC trap 204 in a forward direction (that is, from HC trap inlet port 210 towards outlet port 212). As such, the lack of flow may not generate sufficient pressure difference as may be needed to open the check valve. As a result of shut-off valve 24 opening, flow of exhaust through the second opening 106 of venturi 102 may be enabled, that is un-restricted, resulting in a lower pressure region, or venturi action, being generated in the venturi near third opening 108 and junction 32. This lower pressure region may then draw in exhaust flow from branched conduit 28 into venturi 102. Consequently, heated exhaust gas entering the venturi at first opening 104 may be routed through second opening 106 towards HC trap 204. Subsequently, heated exhaust may be drawn through HC trap 204 into venturi 102 through third opening 108. From here, the exhaust may flow into main exhaust conduit 35 through second opening 106, and further into emission control device 70b wherein the exhaust components may be catalytically processed before being vented to the atmosphere.

Controller may be further configured to adjust an opening of VMV 26 to enable a metered flow of the heated exhaust into HC trap 204 during the purging operation. HCs may be desorbed sequentially from second adsorbent 208 and then first adsorbent bed 206. As previously elaborated, larger HCs, as adsorbed by first adsorbent 206, may be desorbed more effectively by the heated exhaust. Thus, by using a first HC adsorbent 206 with a larger bed volume, adsorption of a larger fraction of cold-start HC emissions may be better enabled during the preceding storing operation.

As previously mentioned, purged HCs may then be drawn along conduit 28 towards venturi 102 through third opening 108, due to the low pressure region, or venturi action, generated as a result of the un-restricting of flow through an opening of the venturi. The purged exhaust may then be treated in emission control device 70b before being vented to the atmosphere along conduit 35. By adjusting the timing and degree of opening of VMV 26, the time and rate of purge flow through the HC trap and towards the venturi may be adjusted. In one example, the time of opening of VMV 26 may be delayed to provide exhaust temperature that is sufficiently hot to enable an efficient desorption of stored HCs. In another example, the flow through VMV 26 may be adjusted to enable a slower flow of exhaust towards the venturi and subsequently into emission control device 70. In yet another example, the flow may be adjusted responsive to a hydrocarbon load of the hydrocarbon retaining system. It will be appreciated that in an alternate embodiment, VMV 26 may be positioned upstream of the HC trap, that is between venturi 102 and inlet port 210. In this configuration, the timing and degree of opening of VMV 26 may be adjusted to adjust a timing and rate of purge flow towards the venturi. In one example, the purge flow may be adjusted responsive to changes in engine operating conditions, such as an air-fuel ratio.

Now turning to FIG. 3A, an alternate example embodiment 300a of HC retaining system 22 is illustrated including HC trap 204 and a single emission control device 70. Herein, HC trap 204 is not coupled to a downstream one-way check valve, although such a check valve may be provided in alternate embodiments.

HC trap 204 may be coupled to main exhaust conduit 35 by branched conduit 316 and bypass conduit 28, the conduits 28 and 316 forming substantially parallel passages. In particular, bypass conduit 28 may couple the HC trap to a position along the main exhaust conduit 35 substantially upstream of emission control device 70 while branched conduit 316 may couple the HC trap to a position along the main exhaust conduit 35 substantially downstream of emission control device 70. Along bypass conduit 28, HC trap 204 may be operatively coupled to vapor management valve (VMV) 26. Furthermore, along branched conduit 316, HC trap 204 may be operatively coupled to exhaust shut-off valve 24, the exhaust shut-off valve located at a junction of the main exhaust conduit 35 and the branched conduit 316. In the depicted example, exhaust shut-off valve 24 may be a diverter valve. In one example, the diverter valve may be a dual bore valve with plates that are offset at 90-degrees. In another example, the diverter valve may be of a three-way valve in nature. By adjusting the configuration of the diverter valve, exhaust shut-off valve 24 may be configured to either divert a flow of exhaust along branched conduit 316, while disabling downstream exhaust flow along main exhaust conduit 35 towards the atmosphere (such as during a storing operation), or divert a flow of exhaust along main exhaust conduit 35 towards the atmosphere while sealing off flow towards branched conduit 316 (such as during a purging operation). While the depicted embodiment shows the use of a diverter valve, other valves may alternatively be used as an exhaust shut-off valve.

When HC storing conditions are met, for example during engine cold start when the temperature of emission control device 70 is below a light-off temperature, a controller may adjust the configuration of exhaust shut-off valve 24 to enable exhaust downstream of emission control device 70 to be directed along branched conduit 316 (and not further along exhaust conduit 35). The controller may further close VMV 26. If present, the controller may also open a one-way check valve positioned downstream of the HC trap. As a result of redirection of exhaust along branched conduit 316 by exhaust shut-off valve 24, flow of exhaust through the second opening 106 of venturi 102 may be unrestricted, while flow of exhaust through the third opening 108 of venturi 102 may be restricted, resulting in a venturi action being disabled, or reduced. Consequently, exhaust that is entering the venturi at first opening 104 may be routed through second opening 106 and then flown through emission control device 70. Exhaust may then enter branched conduit 316 and pass through HC trap 204, specifically through first adsorbent 206 followed by second adsorbent 208, wherein sequentially larger and smaller HCs, respectively, may be adsorbed. The cleaned exhaust may then be returned to exhaust conduit 35 wherefrom it may be vented to the atmosphere. Thus, herein, a venturi may be used, even when there is substantially no venturi action, to provide flow of exhaust through a HC retaining system during a HC storing operation.

FIG. 3B depicts an embodiment 300b of hydrocarbon retaining system 22 during a HC purging operation. When purging conditions are met, for example when emission control device 70 has attained light off temperature, a controller may adjust exhaust shut-off valve 24 to divert a flow of exhaust along main exhaust conduit 35 while sealing off flow towards branched conduit 316. The controller may further open VMV 26. As a result of VMV 26 opening and diversion of exhaust along branched conduit 316 by exhaust shut-off valve 24, flow of exhaust through the third opening 106 of venturi 102 may be enabled, that is un-restricted, resulting in a lower pressure region, or venturi action, being generated in the venturi near third opening 108 and junction 32. This lower pressure region may then draw in exhaust flow from bypass conduit 28 into venturi 102. Consequently, heated exhaust gas entering the venturi at first opening 104 may be routed through second opening 106 towards HC trap 204. Subsequently, heated exhaust may be drawn through HC trap 204 into venturi 102 through third opening 108. From here, the exhaust may flow into main exhaust conduit 35 through second opening 106, and further into emission control device 70 wherein the exhaust components may be catalytically processed before being vented to the atmosphere.

In this configuration, as in the embodiment of FIGS. 2A-B, the timing and degree of opening of VMV 26 may be adjusted to adjust a timing and rate of purge flow towards the venturi, thereby providing a metered purge flow. In one example, the purge flow may be adjusted responsive to changes in engine operating conditions, such as an air-fuel ratio, a catalyst temperature, HC trap temperature, HC load, etc.

Figure 6:
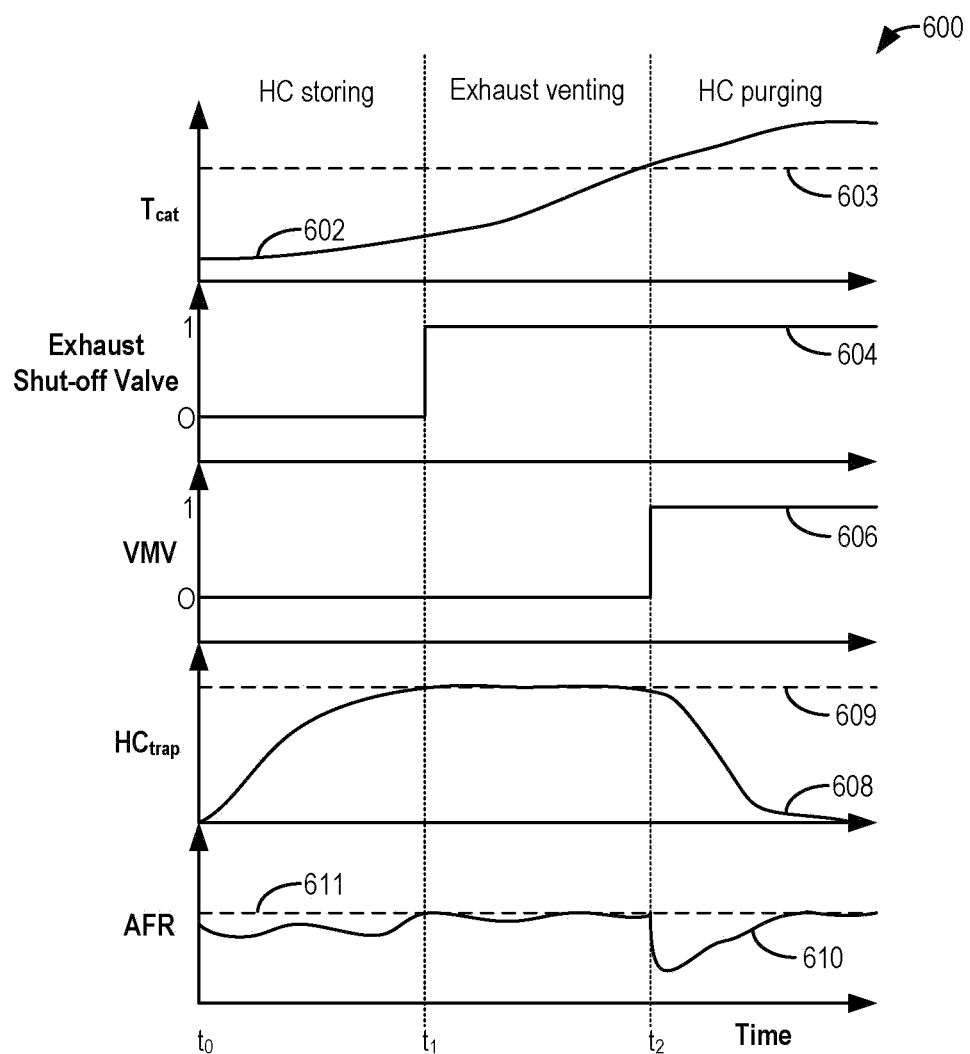
FIG. 6 shows a map depicting air-fuel ratio adjustments responsive to operating conditions of the HC retaining system of FIG. 1.

As elaborated herein with reference to FIG. 6, the controller may be further configured to adjust a combustion air-fuel ratio depending on engine operating conditions. An oxygen sensor (not shown) positioned between venturi 102 and emission control device 70 (or 70b) may provide the controller an estimate of the air-fuel ratio of an exhaust flow entering emission control device 70. Thus, using feedback from the oxygen sensor, controller may adjust a fuel injection so that the air-fuel ratio of exhaust flowing in to emission control device 70 is substantially maintained at or around stoichiometry.

In one example, during the HC storing operation, the controller may adjust the air-fuel ratio to operate at stoichiometry, or slightly lean, so as to reduce the amount of hydrocarbons generated. In another example, during the exhaust venting operation, the air-fuel ratio may be maintained at stoichiometry until the emission control device light-off temperature is reached. In yet another example, during the HC purging operation, the controller may adjust the air-fuel ratio to operate lean. Furthermore, the degree of leanness may be adjusted responsive to the amount and/or rate of HC release. In one example, the air-fuel ratio at the start of the HC purging operation (when a larger amount of HCs are released) may be adjusted to be more lean, to thereby reduce the level of emissions. Then, as the HC purging operation progresses and the amount of HCs released decreases, the air-fuel ratio may be adjusted to be less lean. In one example, the air-fuel ratio may be gradually adjusted such that an air-fuel ratio approximating stoichiometry is reached towards the end of the HC purging operation. In this way, by adjusting the combustion air-fuel ratio responsive to engine operating conditions, including a mode of operating the HC retaining system, the air-fuel ratio of exhaust entering the emission control device may substantially oscillate around stoichiometry, thereby improving the quality of engine emissions.

Figure 4:
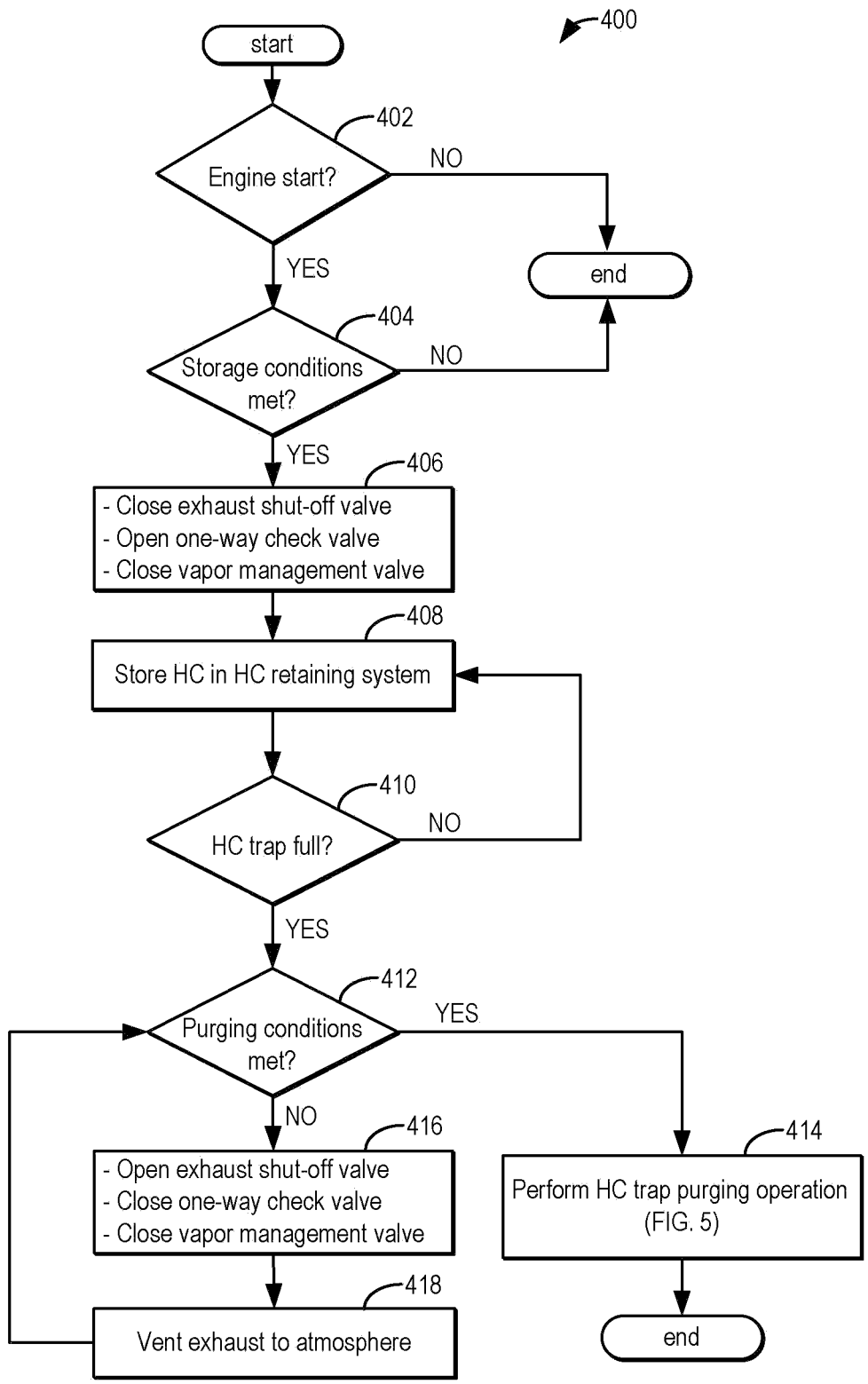
FIG. 4 shows a high level flow chart illustrating a routine that may be implemented for storing hydrocarbons according to the present disclosure.

Referring now to FIG. 4, an example routine 400 is shown for exhaust emission management, specifically for a HC storing operation preceding, and possibly immediately preceding, a HC purging operation. Routine 400 may operate during a cold-start condition or a warm-up condition, such as while the engine or exhaust warms from ambient temperatures to it normal operating temperature range. A subsequent example HC purging routine 500 is further elaborated in FIG. 5. Routines 400 and 500 may be implemented using systems, components, and devices described herein, but alternatively may be implemented using other suitable systems, components, and devices. As such, routines 400 and 500, as depicted herein, may be directed towards the embodiment of HC retaining system 22 as illustrated in FIGS. 2A-B. However, as further elaborated herein, the routines may also be directed towards the embodiment of HC retaining system 22 as illustrated in FIGS. 3A-B with minor variations.

First, at 402, the routine determines whether an engine start is present. For example, the routine may determine whether the engine is being started from rest. Additionally, or optionally, the routine may determine whether the engine has been started via engine cranking operation. If the engine has not been started, the routine may end. When an engine start is present, the routine continues to 404, where the routine determines if HC storage conditions have been met. In one example, storage may be enabled when the capacity of hydrocarbon storage of the retaining system 22 is greater than a threshold value. In another example, storage may be enabled when the HC retaining system 22 has been purged during a previous engine operation. Additionally, the routine may enable storage of hydrocarbons in retaining system 22 when the temperature of retaining system 22 is less than a maximum storage temperature and/or when the temperature of the emission control device 70a is below a threshold temperature (such as a light-off temperature). Further still, the routine may enable storage of exhaust hydrocarbons in retaining system 22 based on a fuel property of the fuel combusted in the engine, such as an alcohol amount in the fuel.

If at 404, storage conditions are met, then at 406, exhaust shut-off valve 24 may be closed, one-way check valve 214 may be opened, and vapor management valve 26 may be closed, to thereby direct exhaust gas from exhaust conduit 35, via junction 32, through the hydrocarbon retaining system 22. In doing so, flow of exhaust through the second opening of the exhaust venturi may be restricted, thereby disabling a venturi action. Consequently, a flow of exhaust from the first opening of the exhaust venturi through the third opening of the exhaust venturi and into bypass conduit 28 may be enabled. That is, a venturi action may be disabled, or reduced. In this way, flow of exhaust through exhaust bypass conduit and into HC retaining system may be provided. At 408, cold-start emissions HCs may be stored in the HC trap until a purging condition is satisfied and/or the HC trap has reached its maximum capacity.

At 410, it is determined whether the HC trap has become full, that is, whether it has reached its maximum capacity. If not, the HC storage operation may continue at 408. If the HC retaining system has reached its maximum storage capacity, then at 412 it is confirmed whether purging conditions have been met. If the HC retaining system is full and purging conditions are met, then at 414, a HC trap purging operation may be performed, as further elaborated in FIG. 5. In contrast, if the HC retaining system reaches its full capacity before purging conditions are met, for example, before an emission control device light-off temperature has been reached, at 416 the exhaust shut-off valve 24 may be opened, VMV 26 may be maintained closed and one-way check valve 214 may be closed. In doing so, flow of exhaust through the second opening of the exhaust venturi may be un-restricted, while flow through the third opening of the exhaust venturi may be restricted. As a result, venturi action may remain disabled, or reduced. Consequently, a flow of exhaust from the first opening of the exhaust venturi through the third opening and into bypass conduit 28 (as was prevalent during HC storing) may be disabled, and a flow of exhaust from the first opening to the second opening and into main exhaust conduit 35 may be enabled. In this way, at 418, exhaust may be vented into the atmosphere and no further HC storage may be enabled. Furthermore, a HC purging operation may be delayed until purging conditions are satisfied.

Figure 5:
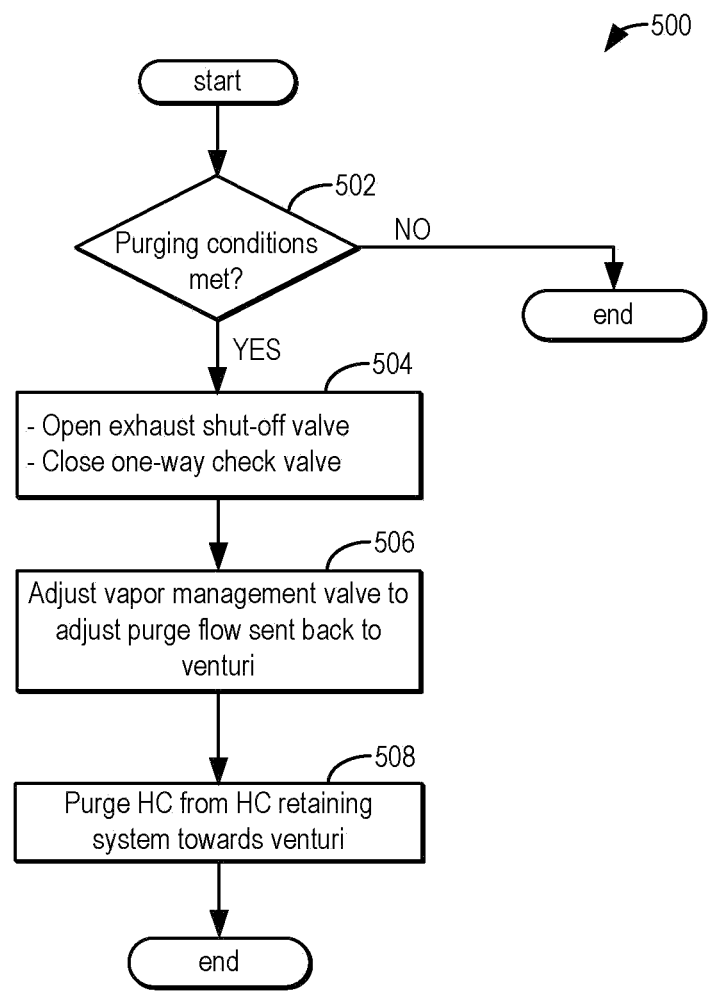
FIG. 5 shows a high level flow chart illustrating a routine that may be implemented for purging hydrocarbons according to the present disclosure.

Now turning to FIG. 5, an example routine 500 is shown for a HC purging operation following, and possibly immediately following, a HC storing operation. At 502, the routine determines whether HC purging conditions have been met. As such, purging may be enabled based on various engine and vehicle operating parameters, including the amount of hydrocarbons stored in the retaining system 22 (such as the amount of hydrocarbons stored in HC trap 204 being greater than a threshold), the temperature of the emission control device 70*a* (such as the temperature being greater than a threshold), temperature of the hydrocarbon retaining system, fuel temperature, the number of starts since the last purge (such as the number of starts being greater than a threshold), fuel properties (such as the alcohol amount in the combusted fuel, the frequency of purging increased as an alcohol amount in the fuel increases), and various others. In one example, purging conditions may be considered met if the routine determines that exhaust gases were previously routed to the hydrocarbon retaining system 22 during the current engine start.

If purging conditions are not met at 502, then the routine may end. If purging conditions are met, then at 504, exhaust shut-off valve 24 may be opened and one-way check valve 214 may be closed. In this way, flow of exhaust through the second opening of the exhaust venturi may be un-restricted, that is enabled. This may generate a lower pressure region near the third opening of the venturi and enable a venturi action near junction 32. Consequently, a flow of exhaust from the HC retaining system may be drawn in to the exhaust venturi through the third opening of the venturi. At 506, the opening of vapor management valve 26 may be adjusted to thereby adjust a rate of purge flow directed through the HC retaining system towards venturi 102.

While the routines of FIGS. 4-5 are directed towards the embodiment of HC retaining system 22 as depicted in FIGS. 2A-B, it will be appreciated that the same routine may alternatively be directed towards the embodiment of HC retaining system 22 as depicted in FIGS. 3A-B. In particular, when directed towards the embodiments of FIGS. 3A-B, the exhaust shut-off valve 24 may be adjusted to divert exhaust towards branched conduit 316 during a HC storing operation and divert exhaust towards exhaust main conduit 35 during a HC purging (or venting) operation. Additionally, the controller may be configured to close VMV 26 during HC storing (and venting) conditions and open VMV 26 during HC purging conditions. In doing so, a flow of exhaust through the third opening of venturi 102 may be alternately restricted and un-restricted, during HC storing and purging operations respectively, to thereby alternately disable and enable a venturi action near the third opening of the venturi and junction 32.

Now turning to FIG. 6, map 600 illustrates air-fuel ratio adjustments responsive to engine operating conditions, specifically responsive to the operating mode of the HC retaining system of FIG. 1. An oxygen sensor positioned between the exhaust venturi and the emission control device (70 or 70*b*) in the main exhaust conduit may provide an estimate of the exhaust air-fuel ratio, using which a controller may be configured to perform feedback control adjustments. In doing so, the exhaust air fuel ratio may be maintained substantially at or around stoichiometry.

Parameters affecting an air-fuel ratio adjustment are depicted along the y-axis while time is depicted along the x-axis. At 602, map 600 depicts a temperature of the emission control device (70 or 70*b*), for example, a catalyst of the emission control device ($T_{cat}$). At 604, a state of the exhaust shut-off valve (ESOV) is depicted. As such, it may alternate between a closed (0) and open (1) state. It will be appreciated that, with reference to the embodiment of HC retaining system 22 as shown in FIGS. 3A-B, a closed (0) state of the ESOV may represent a configuration where the diverter valve diverts exhaust gas along branched conduit 316, while an open (1) state of the ESOV may represent a configuration where the diverter valve diverts exhaust gas along main conduit 35. At 606, a state of the vapor management valve (VMV) is depicted. As such, it may also alternate between a closed (0) and open (1) state. It will be appreciated that the opening degree of VMV may also be adjusted between states 0 and 1, however, for purposes of simplicity, any degree of opening is referenced by state 1 herein. At 608, a HC load ($HC_{trap}$) of the HC trap is depicted. Finally, at 610, adjustments to an air-fuel ratio are depicted.

HC storing under engine cold-start conditions are depicted between $t_0$ and $t_1$. As shown, during this time frame, the catalyst temperature (at 602) may be substantially below a threshold 603, such as a catalyst light-off temperature. Herein, to enable a HC storing operation, ESOV (at 604) and VMV (at 606) may be closed. Further, the controller may adjust the air-fuel ratio (610) during this time frame to operate at stoichiometry (611), or slightly lean, so as to reduce the amount of hydrocarbons generated. As shown at 608, during the course of the HC storing operation, a HC load of the HC trap may increase.

In the depicted example, the HC load of the trap may reach a maximum capacity (609) at $t_1$, before the catalyst has reached its light-off temperature. Accordingly, the HC retaining system may be shifted into an exhaust venting mode between $t_1$ and $t_2$ to prevent further accumulation of HCs in the HC trap. Accordingly, between $t_1$ and $t_2$, ESOV may be opened while VMV is maintained closed. Further, the air-fuel ratio may be maintained at stoichiometry. As exhaust is vented to the atmosphere upon passage through the emission control device, the catalyst temperature gradually rises until the light-off temperature is reached at $t_2$. Thus, at $t_2$, a HC purging operation may be initiated. Accordingly, ESOV may be maintained open and further the VMV may be opened. Consequently, a HC load (608) of the HC trap may gradually decrease. A controller may adjust the air-fuel ratio during the purging operation responsive to the amount and/or rate of HC release. In one example, as depicted, the air-fuel ratio at the start of the HC purging operation (that is, at $t_2$, when a larger amount of HCs are released) may be adjusted to be more lean, to thereby reduce the level of emissions. Then, as the HC purging operation progresses and the amount of HCs released decreases, the air-fuel ratio may be gradually adjusted to be less lean such that an air-fuel ratio approximating stoichiometry is reached towards the end of the HC purging operation. Thus, the combustion air-fuel ratio may be adjusted to be more lean when the HC load is higher and adjusted to be less lean when the HC load is lower. By adjusting the combustion air-fuel ratio responsive to a mode of operating the HC retaining system, the air-fuel ratio of exhaust entering the emission control device may substantially oscillate around stoichiometry, thereby improving the quality of engine emissions.

In this way, a venturi positioned in an engine exhaust may be advantageously used in exhaust after-treatment during both the enablement and disablement of a related venturi action. By adjusting flow through at least one opening of the venturi, a lower pressure region in the venturi may be adjusted, thereby enabling or disabling a venturi action. The venturi action may be adjusted responsive to exhaust venting, HC storing and/or HC purging operations. By sequentially increasing or decreasing a venturi action through an exhaust venturi, a direction of exhaust flow through an exhaust aftertreatment system may be selectively varied. By using a venturi action to enable a purge flow, a purging operation may be enabled without requiring an engine vacuum (although engine vacuum may be used in addition, if desired). By circumventing a purge flow from flowing against an exhaust pressure, the venturi may improve the performance of the associated HC retaining system. Thus, by extending use of the venturi to an engine HC retaining system, even when the venturi action is disabled, and without necessitating additional valves, passages and related hardware, the cost and complexity of a HC retaining system may be reduced while improving its performance.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating an engine having a hydrocarbon retaining system and an emission control device coupled to an engine exhaust, the engine exhaust comprising a venturi, the method comprising:
   during a storing condition, routing exhaust gas through the venturi without generating a venturi action, and then to the hydrocarbon retaining system, while bypassing the emission control device, to store hydrocarbons in the hydrocarbon retaining system, the hydrocarbon retaining system including a first HC-trap and a second HC-trap with different pore sizes; and
   during a purging condition, routing exhaust gas through the venturi while generating venturi action, then to the emission control device, and then to the hydrocarbon retaining system, to purge stored hydrocarbons, wherein a flow of purged hydrocarbons is drawn back to the venturi via venturi action.

2. The method of claim 1 wherein the venturi is positioned at a junction between an exhaust conduit and a bypass conduit of the engine exhaust, the hydrocarbon retaining system positioned in the bypass conduit.

3. The method of claim 2 wherein the venturi includes at least a first, second, and third opening, the first opening located at a broad inlet region of the venturi, the second opening located at a broad outlet region of the venturi, and the third opening located at a narrow region of the venturi.

4. The method of claim 3 wherein routing exhaust gas through the venturi without generating venturi action includes restricting flow through the second opening and flowing exhaust gas from the first opening to the third opening.

5. The method of claim 3 wherein routing exhaust gas through the venturi while generating venturi action includes enabling flow through the second opening and flowing exhaust gas from the second opening to the third opening.

6. The method of claim 3 wherein routing exhaust gas through the venturi without generating venturi action includes restricting flow through the third opening and flowing exhaust gas from the first opening to the second opening.

7. The method of claim 3 wherein routing exhaust gas through the venturi while generating venturi action includes un-restricting flow through the third opening and flowing exhaust gas from the first opening to the third opening via the second opening.

8. The method of claim 2 wherein the flow of purged hydrocarbons directed towards the venturi is adjusted with a valve.

9. The method of claim 1 wherein the flow of purged hydrocarbons is adjusted responsive to a hydrocarbon load of the hydrocarbon retaining system.

10. The method of claim 1 wherein the flow of purged hydrocarbons is adjusted responsive to an air-fuel ratio of the exhaust.

11. The method of claim 1 wherein the first and second HC-traps include zeolites of differing porosity.

12. A system for a vehicle including an engine having an exhaust, the system comprising:
   a venturi coupled in the engine exhaust;
   a hydrocarbon retaining system coupled to the engine exhaust with a first and second HC-trap having different pore sizes; and
   a controller configured to,
   route exhaust gas to the hydrocarbon retaining system through a first path in the venturi to store hydrocarbons in the hydrocarbon retaining system during a storing condition;
   route exhaust gas to the hydrocarbon retaining system through a second path in the venturi to purge stored hydrocarbons during a purging condition, wherein a flow of purged hydrocarbons is directed back towards the venturi via a reduced pressure generated in the venturi by venturi action.

13. The system of claim 12 wherein the controller is further configured to, during the purging condition, adjust a combustion air-fuel ratio responsive to an operating condition of the hydrocarbon retaining system.

14. The system of claim 13 wherein the operating condition of the hydrocarbon retaining system includes a HC load of the hydrocarbon retaining system, and wherein adjusting a combustion air-fuel ratio responsive to an operating condition of the hydrocarbon retaining system includes, adjusting the combustion air-fuel ratio to be more lean when the HC load is higher and adjusting the combustion air-fuel ratio to be less lean when the HC load is lower.

15. An engine method, comprising:
routing engine exhaust gas through a venturi without generating a venturi action, and then to an HC-trap with mesopore and micropore zeolites, while bypassing a three-way catalyst, to store hydrocarbons in the HC-trap; and
routing exhaust gas through the venturi while generating venturi action, then to the three-way catalyst, and then to the HC-trap, purging stored hydrocarbons from the HC-trap and drawing them back to the venturi via venturi action.

\* \* \* \* \*